United States Patent [19]
Dietz et al.

[11] Patent Number: 5,634,103
[45] Date of Patent: May 27, 1997

[54] METHOD AND SYSTEM FOR MINIMIZING BRANCH MISPREDICTION PENALTIES WITHIN A PROCESSOR

[75] Inventors: Carl D. Dietz, Frisco; Robert T. Golla, Plano; Christopher H. Olson, Austin, all of Tex.

[73] Assignee: International Business Machines Corporation, Armonk, N.Y.

[21] Appl. No.: 555,819

[22] Filed: Nov. 9, 1995

[51] Int. Cl.$^6$ .................................................. G06F 9/32
[52] U.S. Cl. .......................... 395/582; 364/948; 364/938; 364/261.7; 395/391
[58] Field of Search ...................................... 395/375, 775, 395/800

[56] References Cited

U.S. PATENT DOCUMENTS

| | | | |
|---|---|---|---|
| 4,777,594 | 10/1988 | Jones et al. | 395/375 |
| 4,833,599 | 5/1989 | Colwell et al. | 395/650 |
| 4,881,194 | 11/1989 | Sprague et al. | 395/375 |
| 5,072,364 | 12/1991 | Jardine et al. | 395/375 |
| 5,127,091 | 6/1992 | Boufarah et al. | 395/375 |
| 5,165,025 | 11/1992 | Lass | 395/375 |
| 5,230,068 | 7/1993 | Van Dyke et al. | 395/375 |
| 5,283,873 | 2/1994 | Steely, Jr. et al. | 395/375 |
| 5,287,467 | 2/1994 | Blaner et al. | 395/375 |
| 5,381,533 | 1/1995 | Peleg et al. | 395/375 |
| 5,394,530 | 2/1995 | Kitta | 395/375 |
| 5,519,841 | 5/1996 | Sager et al. | 395/412 |
| 5,553,255 | 9/1996 | Jain et al. | 395/375 |

FOREIGN PATENT DOCUMENTS 0 592 125 A1  4/1993  European Pat. Off. .

OTHER PUBLICATIONS

"Method for Fetching After Branches in a Superscalar Microprocessor," IBM Technical Disclosure Bulletin, vol. 36, No. 5, May 1993, pp. 255–256.

*Primary Examiner*—David Y. Eng
*Attorney, Agent, or Firm*—Michael A. Davis, Jr.; Andrew J. Dillon

[57] ABSTRACT

A method and system within a processor are disclosed for executing selected instructions among a number of instructions stored within a memory, wherein the processor has a maximum of instructions that can dispatched for execution during each processor cycle. A subset of the instructions are fetched from the memory for execution. A determination is then made whether the set of instructions includes an unresolved branch instruction. In response to a determination that the set of instructions includes an unresolved branch instruction, a prediction is made whether a branch indicated by the branch instruction will be taken or will not be taken. In response to a prediction that the branch will be taken, a nonsequential target instruction indicated by the branch instruction is fetched from memory. A determination is made whether the maximum number of instructions can be dispatched for execution during a processor cycle subsequent to the branch prediction without dispatching instructions within the sequential execution path. In response to a determination that less than the maximum number of target instructions can be dispatched in the processor cycle subsequent to the branch prediction without dispatching instructions within the sequential execution path, an instruction within the sequential execution path is speculatively dispatched for execution. In response to refutation of the branch prediction, the fetch of the nonsequential target instruction is cancelled and the instruction within the sequential execution path is executed, thereby minimizing a performance penalty incurred by the processor due to the mispredicted branch.

18 Claims, 4 Drawing Sheets

```
1000 S0
1004 CMP
1008 S1                    2000 T0
100C BC                    2004 T1
1010 S2
1014 S3
1018 S4
101C S5
1020 S6
  .
  .
  .
```

Fig. 3a

| | CYCLE | | | | | |
|---|---|---|---|---|---|---|
| | 1 | 2 | 3 | 4 | 5 | 6 |
| CURRENT FETCH ADDRESS | 1000 | 1010 | 2000 | 1020 | | |
| FETCH | S0 CMP S1 BC | S2 S3 S4 S5 | T0 T1 | S6 S7 | | |
| DISPATCH | | S0 CMP | S1 S2 | S3 S4 | S5 S6 | |
| EXECUTE | | | S0 CMP | S1 S2 | S3 S4 | S5 S6 |

Fig. 3b

```
1000  S0                      2000  T0
1004  CMP                     2004  T1
1008  S1
100C  BC
1010  S2
1014  S3
  .
  .
  .
```

*Fig. 4a*

Prior Art

| | CYCLE | | | | | |
|---|---|---|---|---|---|---|
| | 1 | 2 | 3 | 4 | 5 | 6 |
| CURRENT FETCH ADDRESS | 1000 | 1010 | 2000 | 1010 | | |
| FETCH | S0<br>CMP<br>S1<br>BC | S2<br>S3<br>S4<br>S5 | T0<br>T1 | S2<br>S3 | | |
| DISPATCH | | S0<br>CMP | S1 | | S2<br>S3 | |
| EXECUTE | | | S0<br>CMP | S1 | | S2<br>S3 |

MISPREDICT PENALTY

METHOD AND SYSTEM FOR MINIMIZING BRANCH MISPREDICTION PENALTIES WITHIN A PROCESSOR

BACKGROUND OF THE INVENTION

1. Technical Field

The present invention relates in general to a method and system for data processing and in particular to a method and system for executing instructions within a processor. Still more particularly, the present invention relates to a method and system for executing instructions within a processor such that the branch misprediction penalty incurred when a branch is incorrectly predicted as taken is minimized.

2. Description of the Related Art

A conventional high-performance processor includes an instruction cache for storing instructions, an instruction buffer for temporarily storing instructions fetched from the instruction cache for execution, a number of execution units for executing sequential instructions, a branch processing unit for executing branch instructions, a dispatch unit for dispatching sequential instruction from the instruction buffer to particular ones of the executions units, and a completion buffer for temporarily storing instructions that have finished execution, but have not been completed.

As is well-known in the art, sequential instructions fetched from the instruction queue are stored within the instruction buffer pending dispatch to the execution units. In contrast, branch instructions fetched from the instruction cache are typically forwarded directly to the branch processing unit for execution. In some cases, the condition register value upon which a conditional branch depends can be ascertained prior to executing the branch instruction, that is, the branch can be resolved prior to execution. If a branch is resolved as taken prior to execution, instructions at the target address of the branch instruction are fetched and executed by the processor. In addition, any sequential instructions following the branch that have been prefetched are discarded. However, the outcome of a branch instruction often cannot be determined prior to executing the branch instruction due to a condition register dependency. When a branch instruction remains unresolved at execution, the branch processing unit utilizes a prediction mechanism, such as a branch history table, to predict which execution path should be taken. In conventional processors, the dispatch of sequential instructions following a branch predicted as taken is halted and instructions within the speculative target instruction stream are fetched during the next processor cycle. If the branch that was predicted as taken is resolved as mispredicted, a mispredict penalty is incurred by the processor due to the cycle time required to restore the sequential execution stream following the branch instruction.

Referring now to FIGS. 4a–4b, there is depicted an example illustrating the mispredict penalty incurred when a branch instruction is incorrectly predicted as taken. In FIG. 4a, an instruction sequence is illustrated which includes a conditional branch instruction (BC) that branches to a target instruction (T0) based upon a condition register value generated by a compare instruction (CMP). The instruction sequence depicted in FIG. 4a also includes 4 sequential instructions S0–S3. A timing diagram depicting the execution of the instruction sequence within a conventional processor having a fetch bandwidth of 4 instructions and a dispatch bandwidth of 2 instructions is illustrated in FIG. 4b.

In cycle 1 of FIG. 4b, instructions S0, CMP, S1, and BC are fetched from the instruction cache and stored within the instruction buffer. During cycle 2, the 4 subsequent sequential instructions (S2, S3, S4, and S5) are fetched while instructions S0 and CMP are dispatched to the execution units for execution. In addition, the conditional branch BC is predicted as taken in cycle 2. Consequently, target instructions T0 and T1 are fetched in cycle 3. During cycle 3, the branch instruction also resolves incorrectly since CMP finishes execution during the cycle. Because BC was predicted as taken in cycle 2, only sequential instruction preceding BC are dispatched in cycle 3. Since the correct current fetch address is not restored until cycle 4, the correct sequential instructions cannot be executed by the execution units until cycle 6. Thus, as illustrated in FIG. 4b, the processor incurs a mispredict penalty between the execution of sequential instructions S1 and the execution of sequential instructions S2 and S3. The mispredict penalty, which is defined as the number of cycles that the execution units are idle or executing instructions within the mispredicted path, delays the execution of S2 by two cycles and the execution of S3 by one cycle, resulting in an average mispredict penalty of 1.5 cycles. A half cycle penalty is incurred during cycle 4 since only one instruction is executed out of the two instructions that could be executed during that cycle.

Because of the performance penalty associated with the misprediction of an unresolved branch as taken, it would be desirable to provide an improved method and system for executing instructions that minimize the branch misprediction penalty incurred in cases in which a branch is incorrectly predicted as taken.

SUMMARY OF THE INVENTION

It is therefore one object of the present invention to provide an improved method and system for data processing.

It is another object of the present invention to provide an improved method and system for executing instructions within a processor.

It is yet another object of the present invention to provide an improved method and system for executing instructions such that such that the branch misprediction penalty incurred when a branch is incorrectly predicted as taken is minimized.

The foregoing objects are achieved as is now described. A method and system within a processor are disclosed for executing selected instructions among a number of instructions stored within a memory, wherein the processor has a maximum of instructions that can dispatched for execution during each processor cycle. A subset of the instructions are fetched from the memory for execution. A determination is then made whether the set of instructions includes an unresolved branch instruction. In response to a determination that the set of instructions includes an unresolved branch instruction, a prediction is made whether a branch indicated by the branch instruction will be taken or will not be taken. In response to a prediction that the branch will be taken, a nonsequential target instruction indicated by the branch instruction is fetched from memory. A determination is made whether the maximum number of instructions can be dispatched for execution during a processor cycle subsequent to the branch prediction without dispatching instructions within the sequential execution path. In response to a determination that less than the maximum number of target instructions can be dispatched in the processor cycle subsequent to the branch prediction without dispatching instructions within the sequential execution path, an instruction within the sequential execution path is speculatively dispatched for execution. In response to refutation of the branch prediction, the fetch of the nonsequential target instruction is cancelled and the instruction within the sequential execution path is executed, thereby minimizing a performance penalty incurred by the processor due to the mispredicted branch.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIGS. 3a–3b illustrate an example of the execution of a sequence of instructions including a conditional branch instruction, wherein the branch misprediction penalty incurred when the branch is mispredicted as taken is minimized according to the method and system of the present invention; and FIGS. 4a–4b depict a prior art example of the execution of a sequence of instructions including a conditional branch instruction, wherein the processor executing the sequence of instructions incurs a branch misprediction penalty.

DETAILED DESCRIPTION OF PREFERRED EMBODIMENT

Figure 1:
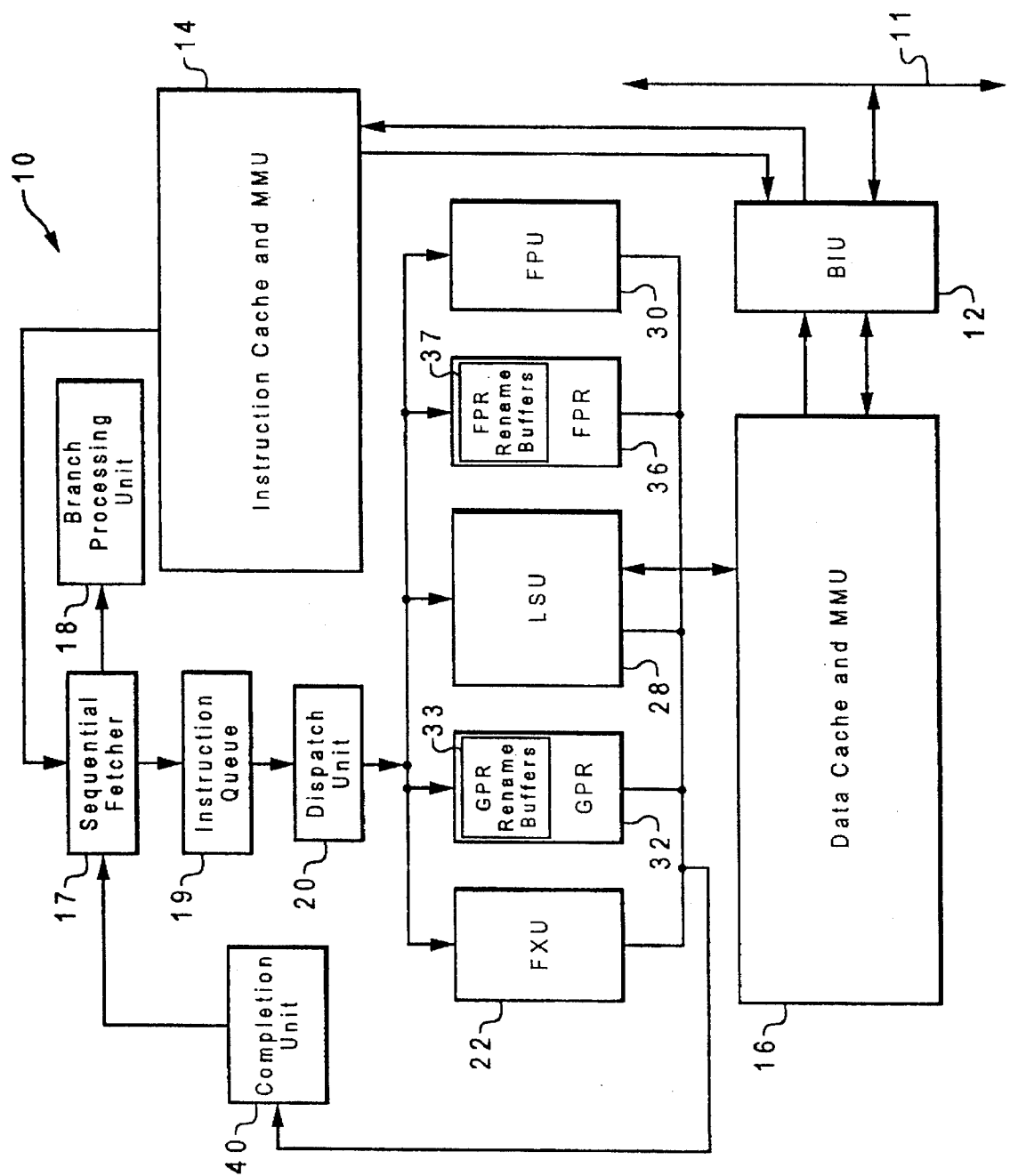
FIG. 1 illustrates a block diagram of a preferred embodiment of a processor which employs the method and system of the present invention.

With reference now to the figures and in particular with reference to FIG. 1, there is illustrated a block diagram of a processor, indicated generally at 10, for processing information according to a preferred embodiment of the present invention. In the depicted embodiment, processor 10 comprises a single integrated circuit superscalar microprocessor. Accordingly, as discussed further below, processor 10 includes various execution units, registers, buffers, memories, and other functional units, which are all formed by integrated circuitry. In a preferred embodiment of the present invention, processor 10 comprises one of the PowerPC™ line of microprocessors, which operates according to reduced instruction set computing (RISC) techniques. As depicted in FIG. 1, processor 10 is coupled to system bus 11 via a bus interface unit (BIU) 12 within processor 10. BIU 12 controls the transfer of information between processor 10 and other devices coupled to system bus 11, such as a main memory (not illustrated). Processor 10, system bus 11, and the other devices coupled to system bus 11 together form a host data processing system.

BIU 12 is connected to instruction cache 14 and data cache 16 within processor 10. High speed caches, such as instruction cache 14 and data cache 16, enable processor 10 to achieve relatively fast access time to a subset of data or instructions previously transferred from main memory to caches 14 and 16, thus improving the speed of operation of the host data processing system. Instruction cache 14 is further coupled to sequential fetcher 17, which fetches instructions from instruction cache 14 during each cycle for execution. Sequential fetcher 17 transmits branch instructions fetched from instruction cache 14 to branch processing unit (BPU) 18 for execution, but stores sequential instructions within instruction queue 19 for execution by other execution circuitry within processor 10.

In the depicted embodiment, in addition to BPU 18, the execution circuitry of processor 10 comprises multiple execution units, including fixed-point unit (FXU) 22, load/store unit (LSU) 28, and floating-point unit (FPU) 30. As is well-known to those skilled in the computer arts, each of execution units 22, 28, and 30 executes one or more instructions within a particular class of sequential instructions during each processor cycle. For example, FXU 22 performs fixed-point mathematical operations such as addition, subtraction, ANDing, ORing, and XORing, utilizing source operands received from specified general purpose registers (GPRs) 32. Following the execution of a fixed-point instruction, FXU 22 outputs the data results of the instruction to GPR rename buffers 33, which provide temporary storage for the result data until the instruction is completed by transferring the result data from GPR rename buffers 33 to one or more of GPRs 32. Conversely, FPU 30 performs floating-point operations, such as floating-point multiplication and division, on source operands received from floating-point registers (FPRs) 36. FPU 30 outputs data resulting from the execution of floating-point instructions to selected FPR rename buffers 37, which temporarily store the result data until the instructions are completed by transferring the result data from FPR rename buffers 37 to selected FPRs 36. As its name implies, LSU 28 executes floating-point and fixed-point instructions which either load data from memory (i.e., either data cache 16 or main memory) into selected GPRs 32 or FPRs 36 or which store data from a selected GPRs 32 or FPRs 36 to memory.

Processor 10 employs both pipelining and out-of-order execution of instructions to further improve the performance of its superscalar architecture. Accordingly, instructions can be executed by FXU 22, LSU 28, and FPU 30 in any order as long as data dependencies are observed. In addition, instructions are processed by each of FXU 22, LSU 28, and FPU 30 at a sequence of pipeline stages. As is typical of high-performance processors, each instruction is processed at five distinct pipeline stages, namely, fetch, decode/dispatch, execute, finish, and completion.

During the fetch stage, sequential fetcher 17 retrieves one or more instructions associated with one or more memory addresses from instruction cache 14. Sequential instructions fetched from instruction cache 14 are stored by sequential fetcher 17 within instruction queue 19. In contrast, sequential fetcher 17 removes branch instructions from the instruction stream and forwards them to BPU 18 for execution. According to the present invention, BPU 18 includes a branch prediction mechanism, which in a preferred embodiment comprises a dynamic prediction mechanism such as a branch history table, that enables BPU 18 to speculatively execute unresolved conditional branch instructions by predicting whether the branch will be taken. Alternatively, in other embodiments of the present invention a static, compiler-based prediction mechanism can be implemented. As will be described in greater detail below, the present invention minimizes the branch misprediction penalty incurred by processor 10 in cases in which a branch is incorrectly predicted as taken.

During the decode/dispatch stage, dispatch unit 20 decodes and dispatches one or more instructions from instruction queue 19 to the appropriate ones of execution units 22, 28, and 30. Also during the decode/dispatch stage, dispatch unit 20 allocates a rename buffer within GPR rename buffers 33 or FPR rename buffers 37 for each dispatched instruction's result data. According to a preferred embodiment of the present invention, processor 10 dispatches instructions in program order and tracks the program order of the dispatched instructions during out-of-order execution utilizing unique instruction identifiers. In addition to an instruction identifier, each instruction within the execution pipeline of processor 10 is associated with a valid bit, which indicates whether the instruction is valid, and a speculative bit that indicates whether the instruction is within a speculative execution path. If a speculative execution path is resolved as incorrect, instructions within the speculative path are flushed from processor 10 by clearing (resetting) the valid bit associated with instructions having a set speculative bit.

During the execute stage, execution units 22, 28, and 30, execute instructions received from dispatch unit 20 as soon as the source operands for the indicated operations are available. After execution has terminated, execution units 22, 28, and 30 store data results within either GPR rename buffers 33 or FPR rename buffers 37, depending upon the instruction type. Then, execution units 22, 28, and 30 signal completion unit 40 that the execution unit has finished an instruction. Finally, instructions are completed in program order by transferring result data from GPR rename buffers 33 or FPR rename buffers 37 to GPRs 32 or FPRs 36, respectively.

Figure 2:
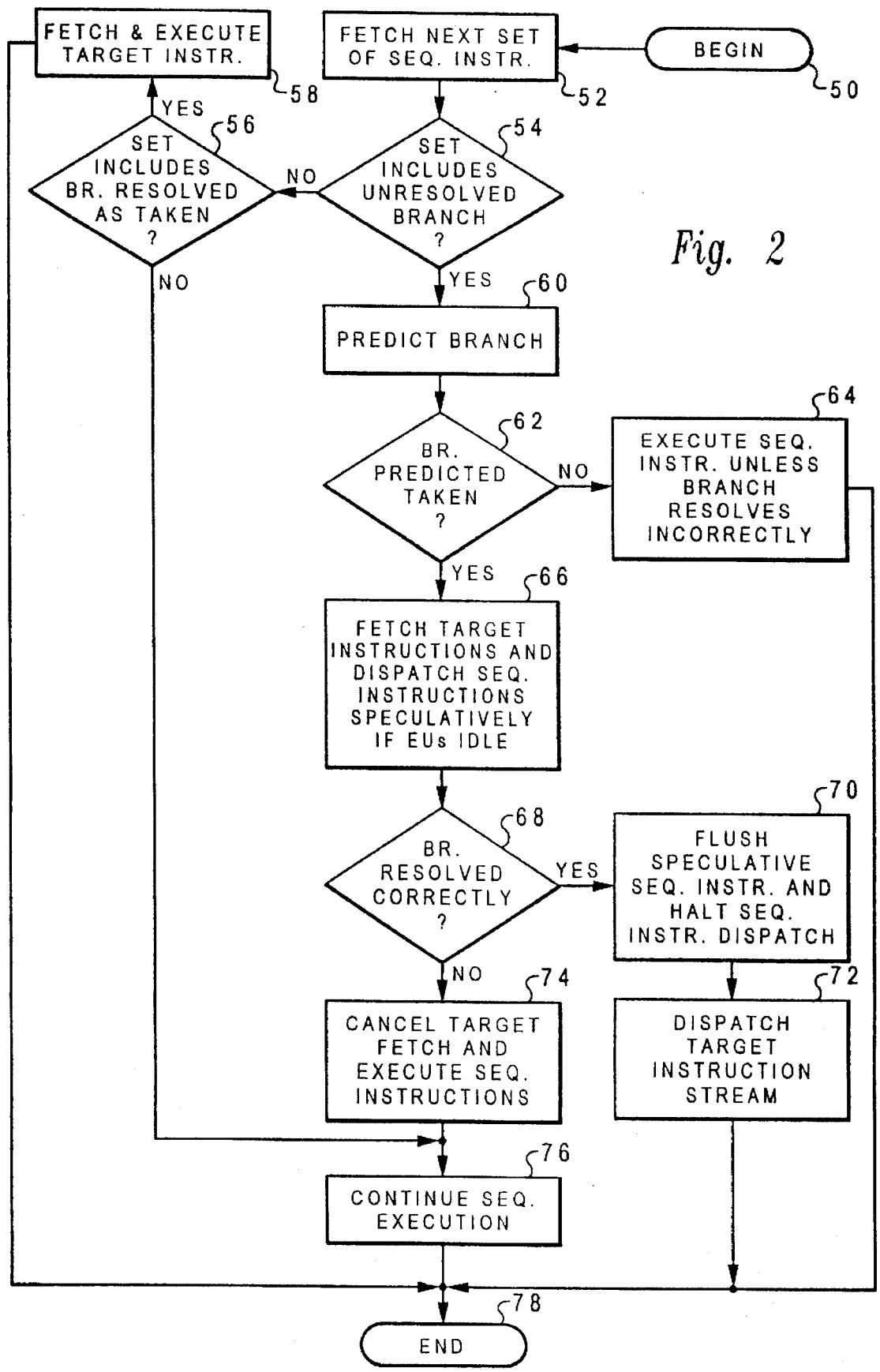
FIG. 2 is a flowchart depicting a method according to the present invention for executing instructions such that the branch misprediction penalty incurred when a branch is incorrectly predicted as taken is minimized.

Referring now to FIG. 2, there is depicted a flowchart of a method of executing instructions according to the present invention which minimizes the branch misprediction penalty incurred when a branch is mispredicted as taken. The method illustrated in FIG. 2 will be described with reference to FIGS. 3a–3b, which depict an exemplary sequence of instructions and timing diagram of the execution of the instructions. The sequence of instructions illustrated in FIG. 3a is identical to the prior art sequence of instructions depicted in FIG. 4a and accordingly illustrates the benefit of the present invention by comparison thereto.

Referring first to FIG. 2, the process begins at block 50 and thereafter proceeds to block 52, which depicts sequential fetcher 17 fetching the next group of instructions from instruction cache 14. The fetch performed at block 52 is illustrated in FIG. 3b at cycle 1, where instructions S0, CMP, S1, and branch instruction BC are fetched. Next, the process proceeds to block 54, which illustrates determining whether the set of instruction fetched at block 52 includes an unresolved branch instruction. If not, a determination is made at block 56 whether the set of instructions fetched at block 52 includes a resolved branch instruction. If the set of instructions includes neither an unresolved nor a resolved branch instruction, the process proceeds to block 76, which depicts continuing the fetching, dispatching, and execution of sequential instructions. However, if a determination is made at block 56 that the set of instructions includes a resolved taken branch instruction, the process passes to block 58, which illustrates processor 10 fetching and executing instructions within the target instruction stream after executing sequential instructions preceding the resolved branch instruction. Thereafter, the process terminates at block 78.

Returning to block 54, if the set of instructions fetched from instruction cache 14 includes an unresolved branch instruction, as does the set fetched during cycle 1 in FIG. 3b, sequential fetcher 17 transfers the unresolved branch instruction to BPU 18. Next, the process passes to block 60, which depicts BPU 18 predicting whether the branch will be taken or not. Referring again to FIG. 3b, the branch instruction is predicted as taken during cycle 2. At cycle 2, the 4 following sequential instructions (S2–S5) are also fetched. Returning to FIG. 2, if the branch is predicted as not taken, the process proceeds from block 60 through block 62 to block 64, which depicts processor 10 executing sequential instructions following the branch, unless the branch instruction later resolves as incorrect. Thereafter, the process terminates at block 78.

However, if the branch is predicted as taken, as illustrated in FIGS. 3a–3b, the process proceeds from block 60 through block 62 to block 66, which depicts fetching the target instructions indicated by the branch and speculatively dispatching sequential instructions previously fetched if execution units 22, 28, and 30 would otherwise be idle. Typically, high-performance processors, such as processor 10 of FIG. 1, achieve 80 percent to 90 percent accuracy in branch predictions. Because of the great likelihood that the predicted branch will resolve correctly, prior art processors flush fetched sequential instructions following the predicted branch, as illustrated in FIGS. 4a–4b, even if the execution units will be idle. In contrast, according to the present invention, sequential instructions following the branch that have already been fetched are speculatively dispatched to the execution units if the execution units would otherwise be idle. Thus, the present invention permits instructions which have a 10–20 percent probability of successful execution to be dispatched pending resolution of a branch, thereby eliminating idle execution unit cycles. As will be appreciated by those skilled in the art, as instruction queue 19 becomes larger, the percentage of branches predicted near the top of instruction queue 19 increases. Predicting branches close to the top of instruction queue 19 provides sufficient cycle time for processor 10 to remove sequential instructions following the branch from instruction queue 19 and to replace the sequential instructions with target instructions. Thus, in processors utilizing larger instruction queues, fewer sequential instructions are speculatively dispatched according to the method of the present invention since execution units will not be idle while waiting for target instructions to be fetched from instruction cache 14.

Referring to cycle 3 of FIG. 3b, because target instructions have not already been fetched, sequential instruction S2 is speculatively dispatched for execution by one of execution units 22, 28, and 30. In addition, target instructions T0 and T1 are fetched from instruction cache 14. Furthermore, branch instruction BC is resolved as mispredicted during cycle 3 since the compare instruction CMP finishes execution, thereby providing the condition register value utilized to resolve BC.

Returning to FIG. 2, the process proceeds from block 66 to block 68, which illustrates determining whether the branch instruction resolved correctly. If the branch instruction resolves correctly, the process proceeds to block 70, which depicts flushing speculative sequential instructions from execution units 22, 28, and 30 by clearing the valid bits associated with sequential instructions having set speculative bits and halting dispatch of additional sequential instructions. The process then proceeds to block 72, which illustrates dispatch unit 20 dispatching the target instruction stream on the following cycle. The process then terminates at block 78.

Returning to block 68, if the branch instruction resolves as mispredicted, the process proceeds to block 74, which depicts cancelling the fetch of the target instructions and executing the sequential instructions which were speculatively dispatched. Since the sequential instructions are no longer within a speculative execution path, the speculative bits associated with the sequential instructions are also cleared at block 74. The process then proceeds to block 76, which depicts continuing the sequential execution stream. Thereafter, the process terminates at block 78. Referring again to FIG. 3b, the steps depicted at blocks 68–76 are illustrated within cycles 4–6. It is important to note in comparison with FIG. 4b, that instructions S1 and S2 are executed during cycle 4 and that two instructions within the sequential path are executed during each subsequent cycle. Thus, in the example depicted in FIG. 3b, the present invention eliminates the branch misprediction penalty.

As has been described, the present invention provides and improved method and system for executing instructions such that the branch misprediction penalty incurred when a branch is mispredicted as taken is minimized. According to the present invention, sequential instructions following a branch instruction that is predicted as taken are speculatively dispatched to execution units that would otherwise be idle, thus minimizing the number of cycles required to recover the sequential execution path if the branch instruction is resolved incorrectly. Because the present invention enhances the utilization of already available resources, the present invention enhances processor performance with little additional hardware cost or processing overhead.

While the invention has been particularly shown and described with reference to a preferred embodiment, it will be understood by those skilled in the art that various changes in form and detail may be made therein without departing from the spirit and scope of the invention.

What is claimed is:

1. A method for executing instructions within a processor, said processor having a memory which stores a plurality of instructions arranged in a sequential order, wherein said processor has a predetermined maximum number of instructions that can be dispatched for execution during each processor cycle, said method comprising:

fetching a subset of said plurality of sequential instructions from said memory for execution by said processor;

determining whether said subset of said plurality of sequential instructions includes an unresolved branch instruction;

in response to a determination that said subset of said plurality of sequential instructions includes an unresolved branch instruction, predicting if a branch indicated by said branch instruction will be taken;

in response to said prediction, fetching at least one nonsequential target instruction indicated by said branch instruction from said memory;

determining whether or not said maximum predetermined number of instructions can be dispatched for execution during a processor cycle following said branch prediction from among sequential instructions preceding said branch instruction and said at least one target instruction without dispatching any sequential instructions which follow said branch instruction in said sequential order;

in response to a determination that said predetermined maximum number of instructions can be dispatched during said processor cycle following said branch prediction from among sequential instructions preceding said branch instruction and said at least one target instruction without dispatching any sequential instructions which follow said branch instruction, dispatching said predetermined maximum number of instructions for execution;

in response to a determination that said predetermined maximum number of instructions cannot be dispatched during said processor cycle following said branch prediction without dispatching any sequential instructions which follow said branch instruction, speculatively dispatching a sequential instruction which follows said branch instruction for execution;

in response to refutation of said branch prediction, cancelling said fetch of said target instruction; and executing said sequential instruction which follows said branch instruction, wherein a performance penalty for a mispredicted branch is minimized.

2. The method for executing instructions within a processor of claim 1, wherein each speculatively dispatched instruction is identified by a state of an associated speculative indicator, said method further comprising:

in response to refutation of said branch prediction, resetting a speculative indicator associated with said sequential instruction which follows said branch instruction.

3. The method for executing instructions within a processor of claim 1, said method further comprising:

in response to refutation of said branch, fetching additional sequential instructions according to said sequential order.

4. The method for executing instructions within a processor of claim 1, said method further comprising:

in response to resolution of said branch as taken, cancelling said sequential instruction which follows said branch instruction path; and halting dispatch of subsequent sequential instructions.

5. The method for executing instructions within a processor of claim 1, said method further comprising:

in response to a failure to resolve said branch prediction during a processor cycle in which said at least one target instruction is fetched, cancelling said sequential instruction which follows said branch instruction; and halting dispatch of subsequent sequential instructions.

6. The method for executing instructions within a processor of claim 1, wherein said step of predicting comprises dynamic branch prediction.

7. A system for executing instructions within a processor, said processor having a memory which stores a plurality of instructions arranged in a sequential order, wherein said processor has a maximum number of instructions that can be dispatched for execution during each processor cycle, said system comprising:

means for fetching a subset of said plurality of sequential instructions from said memory for execution by said processor;

means for determining whether said subset of said plurality of sequential instructions includes an unresolved branch instruction;

means, responsive to a determination that said subset of said plurality of sequential instructions includes an unresolved branch instruction, for predicting if a branch indicated by said branch instruction will be taken;

means for fetching at least one nonsequential target instruction indicated by said branch instruction from said memory in response to said prediction;

means for determining whether or not said maximum predetermined number of instructions can be dispatched for execution during a processor cycle following said branch prediction from among sequential instructions preceding said branch instruction and said at least one target instruction without dispatching any sequential instructions which follow said branch instruction in said sequential order;

means, responsive to a determination that said predetermined maximum number of instructions can be dispatched during said processor cycle following said branch prediction from among sequential instructions preceding said branch instruction and said at least one target instruction without dispatching any sequential instructions which follow said branch instruction, for dispatching said predetermined maximum number of instructions for execution;

means, responsive to a determination that said predetermined maximum number of instructions cannot be dispatched during said processor cycle following said branch prediction without dispatching any sequential instructions which follow said branch instruction, for speculatively dispatching a sequential instruction which follows said branch instruction for execution;

responsive to refutation of said branch prediction, means for cancelling said fetch of said target instruction; and means for executing said sequential instruction which follows said branch instruction, wherein a performance penalty for a mispredicted branch is minimized.

8. The system for executing instructions within a processor of claim 7, wherein each speculatively dispatched instruction is identified by a state of an associated speculative indicator, said system further comprising:

means for resetting a speculative indicator associated with said sequential instruction which follows said branch instruction in response to refutation of said branch prediction.

9. The system for executing instructions within a processor of claim 7, said system further comprising means for fetching additional sequential instructions according to said sequential order.

10. The system for executing instructions within a processor of claim 7, said system further comprising:

means for cancelling said sequential instruction which follows said branch instruction in response to resolution of said branch as taken; and means for halting dispatch of subsequent sequential instructions.

11. The system for executing instructions within a processor of claim 7, said system further comprising:

means for cancelling said sequential instruction which follows said branch instruction in response to a failure to resolve said branch prediction during a processor cycle in which said target instruction is fetched; and means for halting dispatch of subsequent sequential instructions.

12. The system for executing instructions within a processor of claim 7, wherein said means for predicting comprises a dynamic branch prediction mechanism.

13. A data processing system, comprising:

a memory which stores a plurality of instructions arranged in a sequential order;

a processor having a predetermined maximum number of instructions that can be dispatched for execution during each processor cycle, said processor including:

means for fetching a subset of said plurality of sequential instructions from said memory for execution by said processor;

means for determining whether said subset of said plurality of sequential instructions includes an unresolved branch instruction;

means, responsive to a determination that said subset of said plurality of sequential instructions includes an unresolved branch instruction, for predicting if a branch indicated by said branch instruction will be taken;

means for fetching at least one nonsequential target instruction indicated by said branch instruction from said memory in response to said prediction;

means for determining whether or not said maximum predetermined number of instructions can be dispatched for execution during a processor cycle following said branch prediction from among sequential instructions preceding said branch instruction and said at least one target instruction without dispatching any sequential instructions which follow said branch instruction in said sequential order;

means, responsive to a determination that said predetermined maximum number of instructions can be dispatched during said processor cycle following said branch prediction from among sequential instructions preceding said branch instruction and said at least one target instruction without dispatching any sequential instructions which follow said branch instruction, for dispatching said predetermined maximum number of instructions for execution;

means, responsive to a determination that said predetermined maximum number of instructions cannot be dispatched during said processor cycle following said branch prediction without dispatching any sequential instructions which follow said branch instruction, for speculatively dispatching a sequential instruction which follows said branch instruction for execution;

responsive to refutation of said branch prediction, means for cancelling said fetch of said target instruction; and means for executing said sequential instruction which follows said branch instruction, wherein a performance penalty for a mispredicted branch is minimized.

14. The data processing system of claim 13, wherein each speculatively dispatched instruction is identified by a state of an associated speculative indicator, said data processing system further comprising:

means for resetting a speculative indicator associated with said sequential instruction which follows said branch instruction in response to refutation of said branch prediction.

15. The data processing system of claim 13, said data processing system further comprising means for fetching additional instructions according to said sequential order.

16. The data processing system of claim 13, said data processing system further comprising:

means for cancelling said sequential instruction which follows said branch instruction in response to resolution of said branch as taken; and means for halting dispatch of subsequent sequential instructions.

17. The data processing system of claim 13, said data processing system further comprising:

means for cancelling said sequential instruction which follows said branch instruction in response to a failure to resolve said branch prediction during a processor cycle in which said at least one target instruction is fetched; and means for halting dispatch of subsequent sequential instructions.

18. The data processing system of claim 13, wherein said means for predicting comprises a dynamic branch prediction mechanism.

* * * * *